United States Patent [19]

Nagai

[11] 4,358,490
[45] Nov. 9, 1982

[54] TRANSPARENT VACUUM INSULATION PLATE

[76] Inventor: Kiyoshi Nagai, c/o Taiyo Sanso Kabushiki Kaisha, 182-1, Motomachi 3-chome, Naniwa-ku, Osaka-City, Osaka, Japan

[21] Appl. No.: 200,661

[22] Filed: Oct. 27, 1980

[30] Foreign Application Priority Data

Feb. 2, 1980 [JP] Japan .................................. 55-11794

[51] Int. Cl.³ .......................... B32B 3/10; E06B 3/00
[52] U.S. Cl. ..................................... 428/34; 156/109; 428/35; 428/69; 428/119; 428/138; 428/178; 428/913; 428/920
[58] Field of Search ..................... 428/34, 69, 167, 73, 428/178, 137, 138, 457, 920, 913, 35, 116, 118, 119, 461; 52/171, 789, 790; 156/104, 109

[56] References Cited

U.S. PATENT DOCUMENTS 3,192,575 7/1965 Rosenau et al. ...................... 52/171
4,204,015 5/1980 Wardlaw et al. ................... 428/138

FOREIGN PATENT DOCUMENTS 50-17187 2/1975 Japan .
52-77761 7/1977 Japan .
52-129704 10/1977 Japan .

Primary Examiner—Paul J. Thibodeau
Attorney, Agent, or Firm—Griffin, Branigan & Butler

[57] ABSTRACT

A transparent vacuum insulation plate (1) has two or more lattice structures (4, 5, 6 and 7) contained in an evacuated space between two transparent outer plates (2,3). The lattice structures (4, 5, 6, and 7) are placed one on top of another but are shifted in relation to each other. In some embodiments, a semi-transparent film (8) which intercepts infrared rays but permits penetration of visible light is placed between the lattice structures.

9 Claims, 5 Drawing Figures

F I G. 4
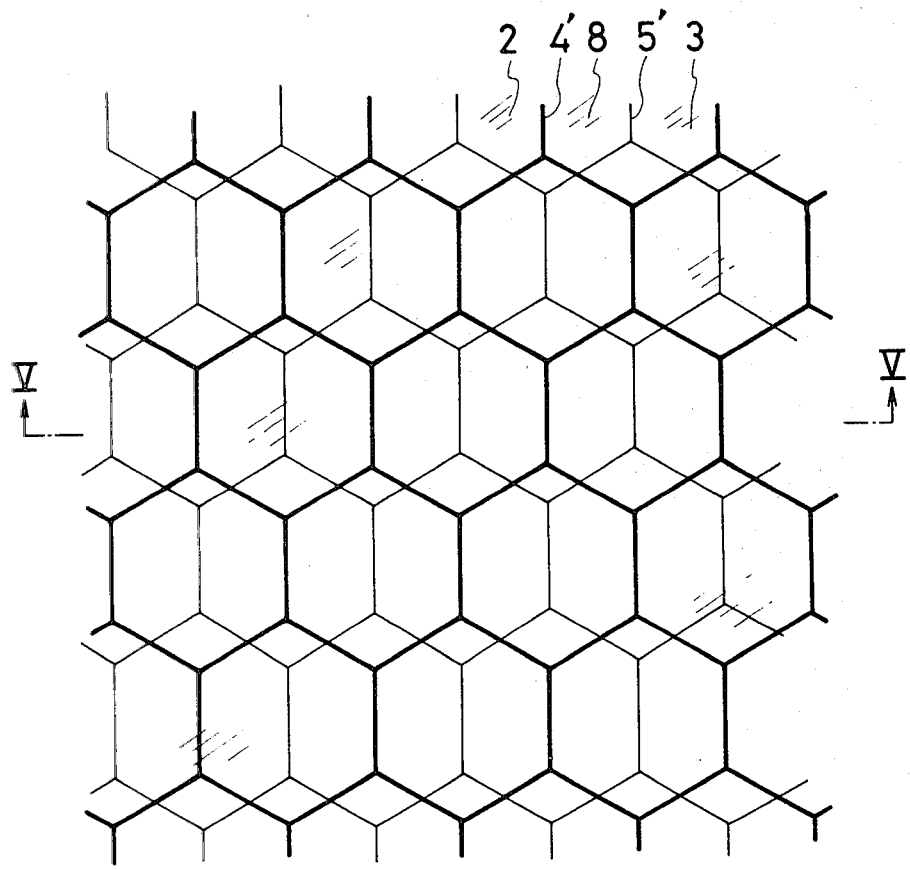
F I G. 5
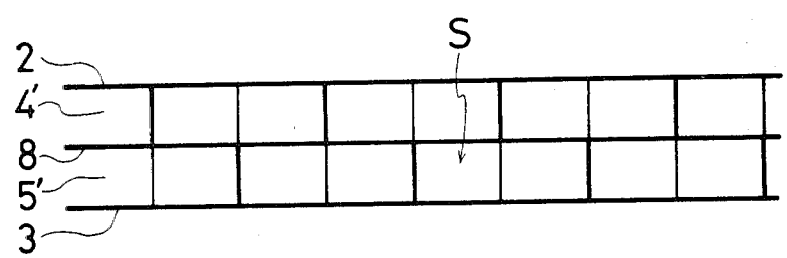

TRANSPARENT VACUUM INSULATION PLATE

BACKGROUND

The present invention relates to a transparent vacuum insulation plate of a type having various uses, such as in the construction of a refrigerated display case, as a peep window on a combustion furnace, and as an insulated container in which high temperature contents are kept.

An insulated face of a refrigerated display case should be transparent so that the contents placed therein may be seen from the outside. For this reason, insulation materials such as foamed styrene or foamed urethane are not suitable. Hence, for many display cases, dried air is sealed in a space between double-glazed insulated faces in order that the inside of the case can be seen from its outside. In such display cases, heat conduction is reduced because of the poor heat conduction characteristics of the dried air. Since the sealed air is dry, there is no dew condensation on the inside of the glass of a low temperature face to affect transparency. However, despite the advantages of the sealed air-type display cases described above, heat transfer by convection in dried air precludes these type display cases from being perfect insulators.

A state of combustion can be observed through a peep window located on the wall of a combustion furnace or the like. However, a peep window does no intercept heat from the inside of the furnace. Therefore, whenever an observer wishes to open the peep window, he must put on heat insulated glasses or wear a heat insulated coat. Naturally, this causes an inconvenience.

The above problems are all solved by employing a transparent insulation plate with excellent insulation characteristics. A vacuum insulation plate is the best structure for both transparency and insulation characteristics.

In the above regard, technology wherein a high or low temperature is maintained within an evacuated double-wall has been disclosed in Japanese laid-open patent application No. 1979-63453.

The present invention concerns an evacuated double-wall insulation structure of a type wherein a honey-comb-type spacer is inserted to enable the structure to withstand a negative pressure. Insulation structures of this type minimize the heat transfer caused by convection. However, some heat is transferred through the spacer. The heat conduction of a spacer may be reduced by increasing the heat transfer resistance. In other words, the cross-sectional area of the spacer must be reduced, while the path of heat conduction therethrough must be extended.

Thus, of the three modes of heat transfer—conduction, convection and radiation—convection is intercepted and conduction is also reduced considerably. However, when installing a transparent insulation structure, heat transfer by radiation still remains a problem.

Heat radiation was not a problem with conventional insulation structures formed with opaque insulation materials (such as styrene or urethane) or with opaque outer walls. In this respect, the radiation was completely intercepted by the opaque metallic outer walls.

Both heat radiation and light transmittance are phenomena of electromagnetic wave transmission. Hence, a radiation problem exists in making a transparent insulation plate. As used herein, "transparency" means transparency against visible light. A wave length of a heat ray, on the other hand, is longer than that of visible light. As used herein, "visible light" has a wave length of 0.4~0.7 microns; a "heat ray" is an infrared ray which has a wave length ranging from 0.7 microns up to 1 mm. Thus, in order to solve the problem with heat radiation, something has to be done so that infrared rays are intercepted, while visible light is transmitted.

It is well known that metallic films have selective transmittance characteristics. Since metal is a good conductor, an electric current occurs in direct proportion to an electric field. However, a metal possesses a finite dielectric constant $\epsilon$. A displacement current is given by time differentiation of the dielectric flux density D. Total electric current, therefore, comprises the electric current occuring in proportion to the electric field (field current) and the displacement current.

The field current generates Joule heat, thus consuming energy. The field current is also in direct proportion to conductivity $\sigma$, while the displacement current is in direct proportion to $\iota\omega\epsilon$. As used herein, an imaginary unit is represented by i, $2\pi$ times the frequency (angular frequency) by $\omega$, and the dielectric constant by $\epsilon$.

The higher the frequency, the less the ohmic electric current. That is, with higher frequency an electric current generating Joule heat decreases, and a displacement current increases. In other words, electromagnetic waves with high frequencies have less attenuation in a metal.

So-called semi-transparent films, which intercept most of the infrared rays and transmit a considerable volume of visible light, are made by pre-selecting a thickness d of a metal. The conductivity $\sigma$ and the dielectric constant $\epsilon$ are governed by the type of metal selected. It is desirable that an angular frequency of an electromagnetic wave, which should be a boundary, approximate $\sigma/\epsilon$.

For a semi-transparent film, various kinds of metals such as aluminum, copper alloy, zinc, etc. can be used. Semi-transparent sheets made by vacuum-metallizing transparent sheets (made from plastic using polyethylene, etc.) are now available on the market. These sheets are often placed on window glasses because they intercept heat rays.

In view of the above, an object of the present invention is to obtain a transparent vacuum insulation plate.

An advantage of the present invention is the provision of a transparent vacuum insulation plate which prevents nearly all heat transfer by convection and conduction.

Another advantage of the present invention is the provision of a transparent vacuum insulation plate which prevents heat transfer by radiation as well as by convection and conduction.

Yet another advantage of the present invention is the provision of a transparent vacuum insulation plate formed in the shape of a square container.

SUMMARY OF THE INVENTION

The present invention concerns a transparent vacuum insulation plate having two or more lattice structures contained in an evacuated space between two transparent outer plates. The lattice structures are placed one on top of another but are shifted in relation to each other so that a path of heat conduction becomes narrower and longer, resulting in increased heat transfer resistance.

In some embodiments of the present invention, a semi-transparent film which permits penetration of visible light but which intercepts infrared rays is inserted between the lattice structures. Insertion of the semi-transparent film prevents heat transfer by convection even though it is transparent.

The transparent vacuum insulation plate of the various embodiments of the present invention has various uses, such as the construction of refrigerated display cases, of insulated containers in which high temperature objects are contained, or of peep windows installed on a combustion furnace, for example.

BRIEF DESCRIPTION OF THE DRAWINGS

FIG. 4 is a plan view of a transparent vacuum insulation plate illustrating other embodiments; and, FIG. 5 is a sectional view taken along the line V—V of FIG. 4.

DETAILED DESCRIPTION OF A PREFERRED EMBODIMENT

Figure 1:
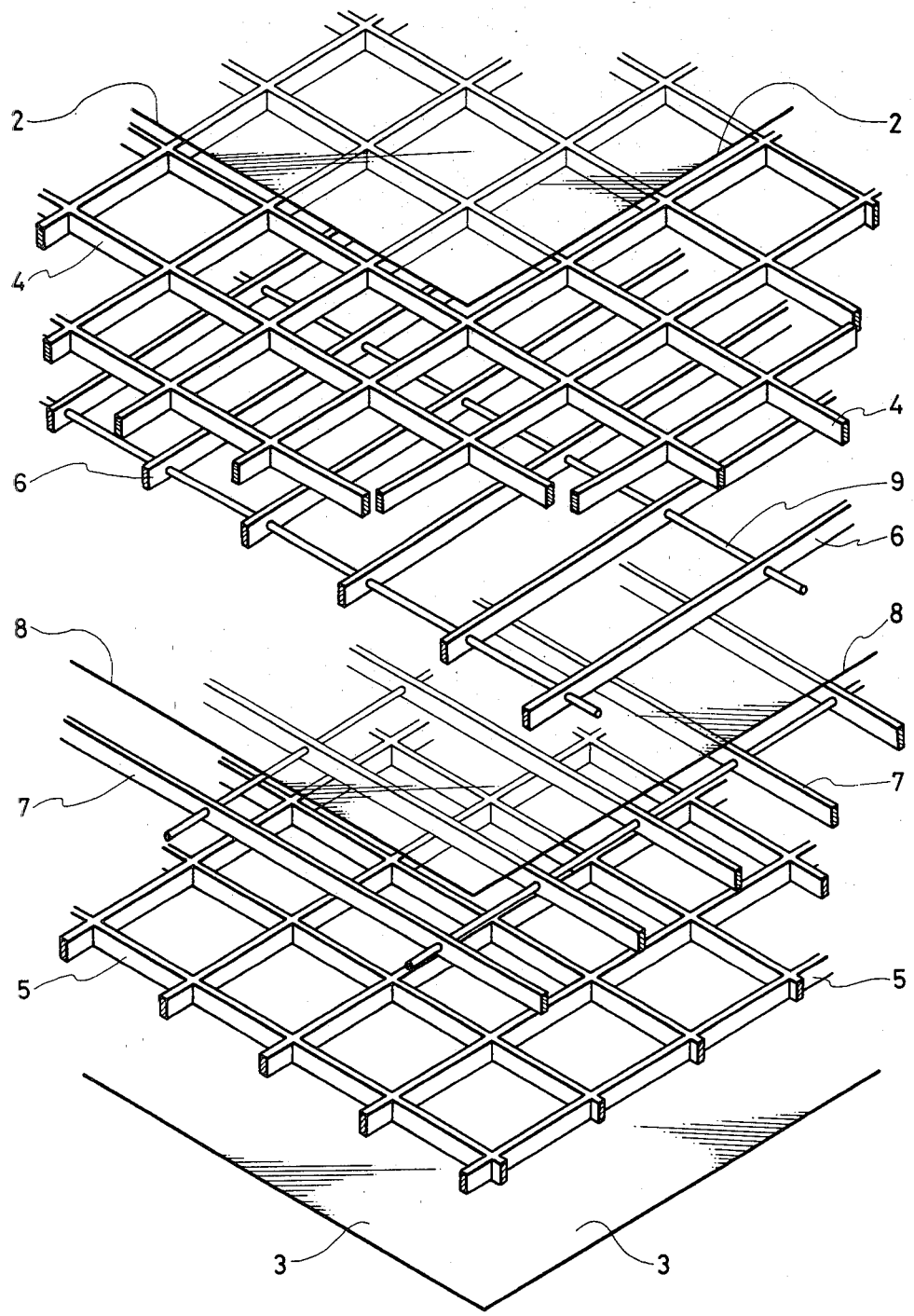
FIG. 1 is an exploded perspective view illustrating an embodiment of the present invention.

While this invention is suceptible of embodiment in many different forms, there is shown in the drawings and will hereinafter be described in detail a preferred embodiment of the invention, with the understanding that the present disclosure is to be considered as an exemplification of the principles of the invention and is not intended to limit the invention to the embodiments illustrated.

Figure 2:
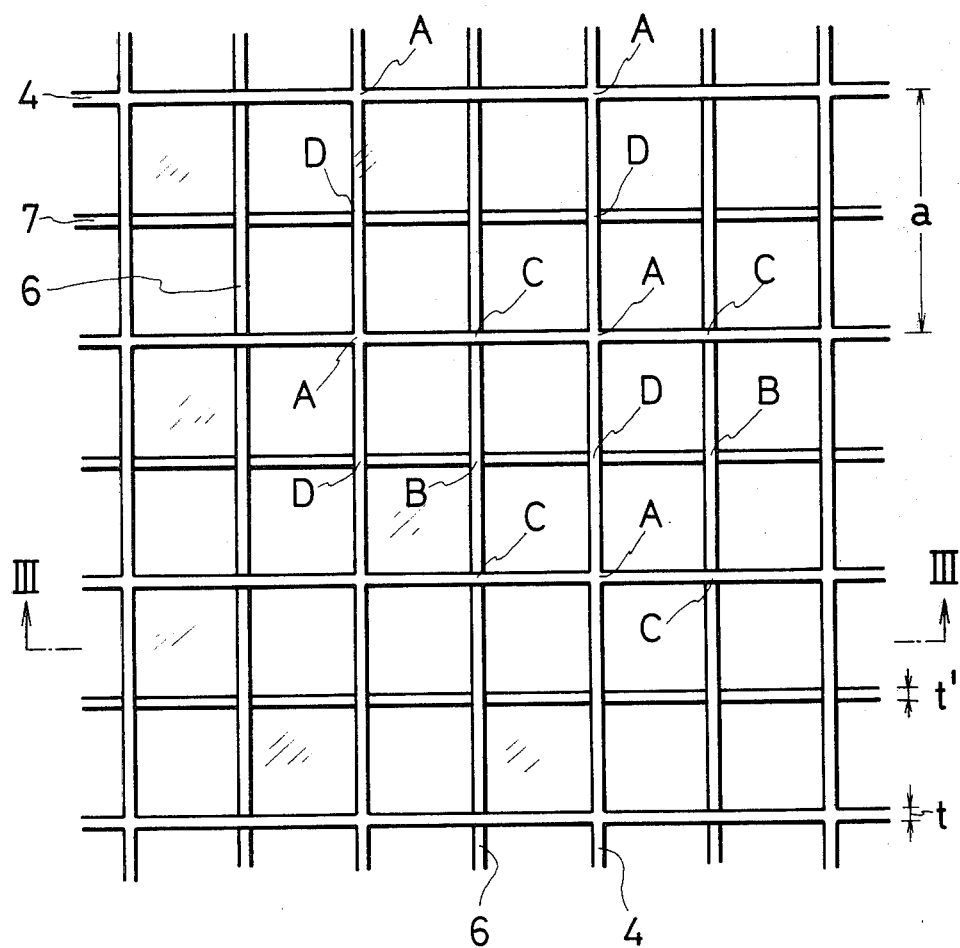
FIG. 2 is a plan view of an insulation plate shown in FIG. 1.
Figure 3:
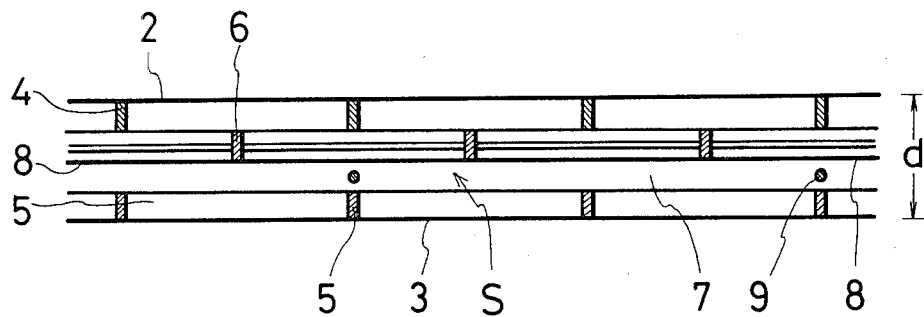
FIG. 3 is a sectional view taken along the line III—III of FIG. 2.

FIG. 1 is an exploded perspective view illustrating an embodiment of the invention. FIG. 2 is a plan view and FIG. 3 is a sectional view taken along the line III—III of FIG. 2.

An insulation plate 1 comprises outer plates 2,3; lattice structures 4, 5, 6, 7 inserted between outer plates 2,3; and, a semi-transparent film 8 sandwiched between the lattice structures 6,7.

Outer plates 2,3 are transparent and preferably have some stiffness. Recommended materials for the plates 2,3 include acrylic resin, quartz, or glass. For furnaces or the like which reach high temperatures, materials such as quartz are preferred. For low temperature environments, materials such as acrylic resin or reinforced glass can be used.

Lattice structures 4,5 comprise members aligned periodically lengthwise and laterally to form squares. Lattice structures 6,7 comprise members extending in parallel either lengthwise or laterally. Lattice structures 6,7 in parallel are connected with a thin coupling rod 9 so that they cannot be separated from each other.

A period a of longitudinal and lateral lattice structures 4,5 and a period b of parallel lattice structures 6,7 are identical. Parallel lattice structures 6,7, when having the semi-transparent film 8 sandwiched therebetween, are placed so that lattice 6 is oriented at a right angle to lattice 7.

Upper and lower longitudinal and lateral lattice structures 4,5 agree vertically, and parallel lattice structures 6,7 are placed one on top of the other, shifting them by half a period lengthwise and laterally.

In the above regard, the vertical alignment of longitudinal and lateral lattice structures 4,5 is necessary to reduce the range of light shielding. The shifting of parallel lattice structures 6,7, by half a period with respect to the longitudinal and lateral lattice structures 4,5 is necessary to make a path of heat conduction longer, and thereby decrease heat conduction.

With a period "a" for the longitudinal and lateral lattice structures 4,5,6,7 and the total thickness of each lattice structure 4,5,6,7 and the semi-transparent film being "d", the shortest path of heat conduction Lm is not d, but the equation becomes:

$$LM = d + a \quad (1)$$

When longitudinal and lateral lattice structures 4,5 are mounted one on top of the other, the area of the range of light shielding of a unit lattice face a x a will be:

$$(t+t')(2a-t-t') \quad (2)$$

For the above equation (2), the thickness of the plate used for longitudinal and lateral lattice structures 4,5 is represented by t, and the thickness of the plate used for parallel lattice structures 6,7 is represented by t'.

For simplicity, assume t = t'. Looking at the insulation plate in plan view, the ratio of a range of light shielding R can be shown as:

$$R \cong (4t/a) \quad (3)$$

The equations (2), (3) are valid if longitudinal and lateral lattice structures 4,5 are mounted one on top of the other vertically. The gap with parallel lattice structures 6,7 need not be by half a period.

When objects which have conduction rates $K_1$, $K_2$ are coupled in parallel, the equation of compound heat conduction rate K will be:

$$K = K_1 + K_2 \quad (4)$$

With materials which possess identical cross-sectional areas, a heat conduction rate is in inverse proportion to a length of material l.

Longitudinal and lateral lattice structures 4,5 possess lattice points A, A, . . . . Intersections of parallel lattice structures 6,7 are B, B, . . . . Intersections of a longitudinal and lateral lattice structure 4 and parallel lattice structure 6 are C, C, . . . . Intersections of a longitudinal and lateral lattice structure 5 and parallel lattice structure 7 are D, D, . . . .

A compound conduction rate K of heat conduction path from one intersection C to four intersections D which surround the intersection C is represented as:

$$K\alpha(1/l_1) + (1/l_2) + (1/l_3) + (1/l_4) \quad (5)$$

However, it can be only valid under a binding condition, which is:

$$l_1 + l_2 + l_3 + l_4 = 2a + 4d' \quad (6)$$

In the above equation, d' represents the vertical thickness of each parallel lattice structure.

To make K minimal under the conditions (5), (6), an equation naturally needs to be:

$$l_1 = l_2 = l_3 = l_4 \quad (7)$$

Therefore, the intersections B, B, . . . of parallel lattice structures 6,7 are shifted by half a period from lattice points A, A, . . . of longitudinal and lateral lattice structures 4,5.

In assembly, the outer plates 2, 3 with the lattice structures 4,5,6,7 and the semi-transparent film 8 mounted therebetween form a sealed space S. Air is evacuated from the space S. After the evacuation, an opening which was used for evacuation (not shown in figures) is sealed and the inner space S remains evacuated.

To equalize the pressure throughout the evacuated space, the semi-transparent film 8 is preferably perforated finely. The vacuum rate is preferably $10^{-5}$ Torr, and more preferably around $10^{-7}$ Torr.

Because this invention is a transparent vacuum insulation structure, two or more lattice structures are enough to increase heat transfer resistance and to cut off heat radiation. Other embodiments include other periodic shapes of lattice such as, for example, hexagonal honeycomb-shaped lattices.

FIG. 4 and FIG. 5 illustrate some other embodiments. Honeycomb-shaped lattice plates 4',5' are mounted one on top of the other, shifting them by half a period. A semi-transparent film 8 is inserted between outer plates 2,3. An inner space S remains evacuated.

A vacuum insulation plate cuts down convection because the inside is evacuated. The lattice structure supports the outer plates 2,3 against a negative pressure. Increased heat transfer resistance reduces heat conduction. In addition, an inserted semi-transparent film transmits visible light but intercepts heat ray radiation. Thus, nearly all heat transfer is blocked but transparency is permitted.

Not all embodiments of the present invention necessarily require the insertion of a semi-transparent film. Although radiation cannot be reduced without the film, conduction and convection can be minimized.

In most cases, radiation is governed by an equation of S. Bolzmann's black-body radiation; that is:

$$U = \sigma T_4 \tag{8}$$

Radiation energy is represented by U, absolute temperature by T. With a high temperature, radiation increases sharply with an absolute temperature to the fourth power.

Under a refrigerated condition, radiation is extremely weak. Heat transfer by convection or conduction is completely different from that of radiation. Convection and conduction are in direct proportion to a temperature difference between both faces of an insulation structure, but not in direct proportion to an absolute temperature to the fourth power on the higher temperature side. Either with a furnace (which reaches a high temperature or with a freezer) convection and conduction are in direct proportion to a temperature difference, while cooling containers such as freezers, refrigerators causes very little problem with radiation. Therefore, with cooling containers, a semi-transparent film is not required.

Experiments were conducted to determine the thermal conductivity of various transparent vacuum insulation plates. Three different types of insulation plates were constructed. Each plate had the dimensions 340 mm×440 mm×20 mm. For purposes of these dimensions, the thickness is the thickness of the insulation part, excluding the thickness of the outer plates.

EXAMPLE 1

The first transparent plate tested comprised a plate glued between transparent acrylic plates each measuring 340 mm×440 mm×2 mm. The thermal conductivity of this first transparent plate measured 0.016 kcal/m Hr C.

EXAMPLE 2

The second transparent plate tested comprised outer plates of transparent acrylic plate (340 mm×440 mm×2 mm) and transparent acrylic lattice structures 4,5 (2 mm thick, 5 mm wide) fabricated as shown in FIG. 1. The length of the side of a square from center to center was 30 mm.

The lattice structures 4,5 were mounted one on top of the other. In between the lattice structures 4,5, acrylic cross-pieces 6,7 (of the same material and dimensions) were aligned in parallel at 30 mm intervals. A semi-transparent film (Daskin reflection film F-88 silver type) was inserted between the cross-pieces 6,7. The insulation plate was covered with the acrylic outer plates and glued together. The vacuum rate was $4 \times 10^{-6}$ Torr. The thermal conductivity of this second transparent plate measured 0.011 k Cal/m Hr C.

EXAMPLE 3

The third transparent plate tested resembled the second plate described in Example 2 above, except that a semi-transparent film 8 was not inserted between the cross-pieces 6,7. The thermal conductivity of this third transparent plate measured 0.018 k cal/m Hr C.

Through these experiments, it was verified that a transparent insulation structure constructed in accordance with this invention possesses better insulation characteristics than an opaque urethane.

In addition to the advantages already described, a vacuum shuts off sounds completely. The sound shut-off characteristics are extremely excellent because lattice structures are shifted, and mounted on top of the other, resulting in less stiffness. Especially, its cut-off frequency is remarkably low.

A transparent vacuum insulation plate in this invention is well adapted for a freezer or peep window on a furnace. At the same time, it can be used as a transparent panel for a refrigerated display case. A box-type container is made with vacuum insulation plates. This transparent container can keep its contents either hot or cold.

Having explained the structure and operation of the device, other modifications will become apparent to those of skill in the art without departing from the scope and spirit of the present invention as pointed out in the appended claims.

What is claimed is:

1. A transparent vacuum insulation plate comprising:
   two transparent outer plates defining an evacuated space therebetween;
   at least two lattice structures lying in respective planes in said space between said outer plates, said planes wherein said lattice structures lie being parallel to the planes of said outer plates, each of said lattice structures comprising a plurality of members periodically positioned to form a geometrical pattern, said lattice structures being shifted relative to one another so that at least two neighboring lattice structures (1) do not have their patterns substantially aligned in a direction perpendicular to the planes of said lattice structures and (2) have their patterns crossing one another only at points periodically positioned in accordance with said geometrical pattern, said shifting of said lattice structures requiring that heat conduction from one lattice structure to a neighboring shifted lattice structure occur only at said crossing points and that a heat transfer component exist in a direction parallel to the planes wherein said lattice structures lie so that the total distance of heat conduction through said plate is greater than the perpendicular distance between said transparent outer plates; and, a semi-transparent member positioned between two neighboring lattice structures, said semi-transparent member adapted to permit penetration of visible light therethrough but to filter the passage of infrared rays.

2. The transparent vacuum insulation plate of claim 1, wherein said semi-transparent member comprises a metallic film.

3. The transparent vacuum insulation plate of claim 1, wherein said semi-transparent member comprises a transparent plastic sheet whereon metal is vacuum-metallized.

4. The transparent vacuum insulation plate of claim 1, wherein the geometrical pattern of at least one of said lattice structures is substantially square.

5. The transparent vacuum insulation plate of claim 1, wherein the geometrical pattern of at least one of said lattice structures is substantially hexagonal.

6. The transparent vacuum insulation plate of claim 1, wherein said outer plate comprises acrylic resin.

7. The transparent vacuum insulation plate of claim 1, wherein at least one of said lattice structure comprises acrylic resin.

8. The transparent vacuum insulation plate of claim 1, wherein said vacuum insulation plate is formed as a square container.

9. The transparent vacuum insulation plate of claim 1, wherein said vacuum insulation plate is formed as a box-type container.

* * * * *